(12) United States Patent
Hanskamp (10) Patent No.: US 8,397,671 B2
(45) Date of Patent: Mar. 19, 2013

(54) MILKING DEVICE FOR THE MILKING OF MILKING ANIMALS

(75) Inventor: Hendrik Jan Hanskamp, Zelhem (NL)

(73) Assignee: Hanskamp Agrotech B.V., Zelhem (NL)

( * ) Notice: Subject to any disclaimer, the term of this patent is extended or adjusted under 35 U.S.C. 154(b) by 573 days.

(21) Appl. No.: 12/596,474

(22) PCT Filed: Feb. 8, 2008

(86) PCT No.: PCT/NL2008/050074
§ 371 (c)(1),
(2), (4) Date: Oct. 19, 2009

(87) PCT Pub. No.: WO2008/097093
PCT Pub. Date: Aug. 14, 2008

(65) Prior Publication Data
US 2011/0239943 A1    Oct. 6, 2011

(30) Foreign Application Priority Data

Feb. 9, 2007   (NL) .................................... 2000483

(51) Int. Cl.
*A01J 5/16* (2006.01)
(52) U.S. Cl. .................................................. 119/14.38
(58) Field of Classification Search ............... 119/14.47, 119/14.49, 14.36, 14.38
See application file for complete search history.

(56) References Cited

U.S. PATENT DOCUMENTS

| 4,034,712 A * | 7/1977 | Duncan ...................... 119/14.36 |
| 2011/0107971 A1 * | 5/2011 | Petterson ................... 119/14.08 |

* cited by examiner

*Primary Examiner* — Kristen C Hayes
(74) *Attorney, Agent, or Firm* — Jordan IP Law, LLC; Todd A. Vaughn (57) ABSTRACT

The invention relates to a milking device for milking animals, the required vacuum being, for example, generated by generating compressed air using a compressor and passing said compressed air through the system, the compressed air creating a vacuum at all required locations by means of the Venturi system. Because this vacuum differs at the various locations, the reduced pressure can be regulated precisely and adapted as required.

9 Claims, 10 Drawing Sheets

MILKING DEVICE FOR THE MILKING OF MILKING ANIMALS

CROSS REFERENCE TO PRIOR APPLICATIONS

The present application is a National Stage Application of PCT International Application No. PCT/NL2008/050074 (filed on Feb. 8, 2008), under 35 U.S.C. 371, which claims priority to The Netherlands Patent Application No. 2000483 (filed on Feb. 9, 2007), which is hereby incorporated by reference in its entirety.

BACKGROUND OF THE INVENTION

The invention relates to a milking device for the milking of milking animals, such as cows and goats.

The invention further relates to a method for the milking of animals.

The mode of operation and embodiment of a milking device of this type, in particular for the pneumatic milking of cows and similar cattle, is generally described in, inter alia, American patent specifications U.S. Pat. Nos. 6,510,812 and 4,200,058. The mode of operation of the milking devices described therein is based on the application of suction force which is supplied by a vacuum pump. A vacuum conduit which is connected to this central pump can be used to provide a vacuum at the desired locations in the system.

In U.S. Pat. No. 4,200,058 the teat cups are each connected to a common source of air under reduced pressure in order to provide reduced pressure between a teat cup and a teat cup liner for the releasing of milk from the teats of a cow. In addition, each teat cup is connected to a source of reduced or overpressure for the inflating or else changing by reduced pressure of the shape of a teat massage liner in the teat cup.

U.S. Pat. No. 6,510,812 describes a milking device in which what is known as "cross-flow" in a milk claw from one teat cup to the other is prevented by mutually adapting the pressure cycle in the teat cups of the milk claw.

Almost all milking machines operate at a reduced pressure of approximately 50 kPa. This suction force is sufficient to draw the milk out of the teat. The basic elements of a milking machine according to the prior art are a vacuum pump, vacuum conduits, hoses, a vacuum regulator, a vacuum meter, a pulsator and a milk claw usually comprising four teat holders or teat cups. For the discharging of the milk, use is usually made of milk conduits having received therein an air separator and a milk pump which pumps the milk into a milk tank.

A vacuum is required in the following components: the pulsation vacuum in the teat holder that ensures the opening and closing of the teat and the milk vacuum which is used to cause the milk to flow out of the teat.

A teat holder consists of a teat cup having therein a teat liner. This teat liner is placed in the teat holder in such a way that the teat holder contains two spaces, namely the pulsation space and the teat space. The pulsation space is connected to the pulsator via the short pulsation hose, the air distributor and the long pulsation hose. The teat space is connected to the milk conduit via the short milk hose, the milk collector and the long milk hose. The milk is discharged via the milk claw and the long milk hose and the milk conduit to the milk receptacle. This milk receptacle consists of an air separator and a milk pump.

The existing milking devices use two types of vacuum, namely the milk vacuum prevailing in the claw and under the teat point and what is known as the pulsation vacuum which pulsates between the teat liner and the peripheral wall of the teat holder.

The foregoing is described, inter alia, in the aforementioned U.S. Pat. No. 6,501,812.

The existing milking device has various drawbacks.

For example, the vacuum pump consumes a lot of energy, because it is in operation throughout the milking time. In addition, a lot of energy is lost, because the vacuum regulator regulates the vacuum level by allowing atmospheric air into the system.

Furthermore, the various components of the known milking device influence one another, because everything is connected to a central vacuum pump. Variations in the vacuum in a pressure exchanger cause throughout the system peaks and troughs in the pulsation curve and this is at odds with the endeavor to achieve a constant and settled vacuum image, providing the best milk results and the least teat point loading.

In addition, the costs of the installation are high because the central vacuum system requires conduits and tubes having a large diameter.

Furthermore, the known milking device contains a large amount of air which inevitably also pulsates and must be discharged, because the distance between the pulsator and milk cup is often about two meters and the hose has to have a large diameter.

When the flow of milk decreases, for example when the milking of an animal has almost been completed, a high vacuum is no longer necessary. However, in the existing milking devices the vacuum cannot be lowered, and this is disadvantageous owing to the risk of injury caused by teat point loading.

In addition, a large amount of energy is lost and an existing milking device requires a large amount of reserve capacity of the vacuum installation, because during the attachment of the teat holders to the teats of, for example, a cow there is momentarily an open connection between atmospheric air and the milk vacuum. This draws in a large amount of air which subsequently has to be separated again from the milk.

In addition, the use of an oil-lubricated vacuum pump can lead to oil entering the conduit system, and milk can enter into contact with the outside air and the usually unhygienic shed environment.

The above-mentioned drawbacks also apply to EP-A-1 369 032 which describes a milking device which proposes for each teat cup a vacuum tank/milk separator system which is in itself traditional, and in which said systems are again coupled to a buffer vessel. A solution of this type is complex, has large dimensions and in addition the above-mentioned drawbacks.

SUMMARY OF THE INVENTION

An object of the invention is to eliminate at least one of the above-mentioned drawbacks.

For this purpose, the invention provides a milking device for the milking of animals, using a vacuum, wherein the vacuum which is required for milking is generated by means of one or more vacuum generators, the one or more vacuum generators being driven by a fluid under overpressure. This is brought about by replacing the central vacuum pump with vacuum generators which are driven by means of overpressure. The vacuum generators ensure a vacuum at all required locations in the system and are adjustable independently of one another as required.

Milking devices are becoming more and more automated and even computerized and robotized. The device according to the invention is highly suitable to be almost fully automated, for example to be employed in a milking robot or to form part thereof.

In one exemplary embodiment the vacuum generator comprises an ejector. An ejector of this type has an inlet, an outlet and a channel which joins the inlet and the outlet together. Between the inlet and the outlet the channel is provided with a restriction so the cross section is reduced. The ejector further has a reduced pressure channel which emerges at the location of the restriction.

The vacuum is generated at the desired locations by fluid under overpressure. The fluid is, for example, generated centrally by a compressor and is conveyed via conduits and valves to those locations where a vacuum is required. The ejector can also comprise a multistage ejector. In one embodiment vacuum generators are placed decentrally. The generators may, for example, be decentrally placed ejectors. For example, one vacuum generator can be employed for each animal to be milked. Alternatively, even a plurality of vacuum generators can be employed for each animal. For example, in or for each milk cup, or else every 15 minutes, in each milk separator, for each animal for the pulsator.

In one embodiment each vacuum generator is provided with at least one ejector and a controllable or else regulatable supply for fluid under overpressure. This allows not only the pressure to be adapted rapidly, but also the level to be adjusted where necessary.

In one embodiment the fluid is a gas, in a further embodiment air, for example compressed air which is simple to generate and to handle.

A vacuum can be created in the teat cup by passing a fluid under overpressure through an ejector. This produces in the milk cup around the teat liner a vacuum or reduced pressure. In one embodiment the ejector is placed in or on the teat cup.

In one embodiment each teat holder can be activated independently of the others. Varying the pressure of the fluid under overpressure allows the capacity of the generated vacuum to be controlled.

Similarly, in one embodiment the milk vacuum can be generated, for example so as to be adapted for each animal to be milked.

In one embodiment a vacuum can be generated in the air separator also by means of a Venturi system. This allows air to be drawn through a milk hose and there is produced via a milk collector and the short milk hose a vacuum in the teat space, as a result of which milk flows out of the teat and can be discharged to the milk receptacle.

All references in the present document to pressure relate to absolute pressure.

The present document uses the term "vacuum". This refers to a reduced pressure with respect to atmospheric pressure. In fact, this term should be taken to refer to the more correct term "reduced pressure".

Furthermore, the present document uses the words "teat cup" and "teat holder" interchangeably to refer to the same component.

The term "teat cup space" is also used to refer to the pulsation space.

The present document also uses the term "overpressure". This refers to an overpressure with respect to atmospheric pressure. For pneumatic driving, the overpressure is usually substantially higher than atmospheric pressure, and the term "compressed air" is also used occasionally. The present invention uses air or gas under overpressure. In one embodiment use is made of compressed air. This refers to air having a pressure greater than atmospheric pressure, for example of from approximately 2-20 bar (1-19 bar of overpressure). In many cases compressed air is standardized to a pressure of from approximately 3-15 bar (2-14 bar of overpressure). However, the invention may also use more elevated pressures.

However, it has been found that even at relatively low pressures, i.e. 1.5 bar (0.5 bar of overpressure) the vacuum generator can be driven for milking.

A milking device according to the invention has, inter alia, the following advantages.

A vacuum is created only at the correct location and at the correct moment. If a teat holder is not used, then no vacuum is created at that location either. As a result, the device consumes much less energy.

Because all of the teat cups create a vacuum independently of one another, the pulsation in one teat holder no longer influences the pulsation curve in another teat holder. The pulsation curve and the pulsation cycle of all of the teat cups are adjustable separately and independently. This is important because the hindquarters of the udder of a cow are different from the front quarters and sometimes call for a different pulsation or pulsation cycle.

Thus, the vacuum can be adjusted and controlled separately for each animal. Also, because a vacuum can be created separately at all locations, it is possible separately to adjust the milk vacuum in the teat holder. By electronically regulating the milk vacuum for each animal or for each udder quarter (each teat) and adapting it to the requirements of that moment, it is possible to limit as far as possible teat point loading during milking, and this prevents the teat from becoming irritated during the milking process and thus, for example, callous.

In one embodiment the fluid under overpressure is a gas under overpressure. In a further embodiment it is air under overpressure. An advantage of this is that thinner and lighter hoses leading to the teat cup can be used, as a result of which said hoses hang more freely and are thus easier to handle. Because the tubes and hoses for compressed air require a smaller diameter, the entire system is lighter, simpler and less expensive. Furthermore, a milking device driven by compressed air usually operates much more quietly than the device comprising a central vacuum pump.

Generating during connection overpressure in the space between the milk cup and teat liner closes the teat liner, as a result of which there is no longer an open connection between the atmospheric air and milk vacuum. A large amount of capacity is lost through the open connection in the existing system. In addition, the milk can become contaminated with impurities which may have to be removed again at a later stage.

In one embodiment the milking device is further provided with at least two teat cups each having a peripheral teat cup wall having therein a teat liner comprising a teat space in which a teat can be placed, and between the teat liner and the teat cup wall a teat cup space or pulsation space, and further provided with a compressor provided with at least one pressure conduit for the supplying of air under overpressure during said placing in the milking device where a vacuum has to be created, such as in the teat cup, the teat cups being provided with an ejector provided with an inlet which is connected to the pressure conduit, a flow channel provided with a restriction, an outlet for letting air out of the ejector, and a reduced pressure connection which has an opening in the flow channel between the inlet and the outlet in the restriction and in the teat cup space, in such a way that, when compressed air is passed through the ejector, a vacuum is produced in the teat cup space so a teat received in the teat liner is opened and the milk is able to flow.

In one embodiment of the milking device the pressure conduit is further connected to an inlet in a further ejector having a reduced pressure connection which is operatively connected to an air separator for the generating in the air separator of a vacuum for the causing via a milk conduit, which may or may not be provided with a milk collector, of a milk vacuum in the teat space for drawing out of the teat milk which is discharged to the air separator via the milk conduit.

In one embodiment the milking device is further provided with a control system for controlling an inflow of compressed air into the teat cup space for producing an overpressure, as a result of which the teat liner is closed so when the teat cup is not placed against a teat no air is drawn via the teat liner toward the milk vacuum, as a result of which no loss of vacuum occurs and less reserve capacity and less power of the vacuum generator are required.

In one embodiment of the milking device the outlet in the ejector comprises a valve for the closing-off of the outlet in the ejector so the compressed air provides an overpressure in the space for the squeezing of the teat liner, so when the teat cup is not placed against a teat air is no longer drawn via the teat liner toward the milk vacuum.

In one embodiment of the milking device the outlet in the ejector is formed in such a way that said outlet can be closed off by hand. When the teat cup comprising the ejector is placed by hand against a teat, an operator can easily shut off the outlet so the compressed air provides an overpressure in the space for the squeezing of the teat liner, so when the teat cup is not yet placed against a teat air is no longer drawn via the teat liner toward the milk vacuum.

In one embodiment the milking device is further provided with a measuring device for the measuring of a milk flow and which is operatively connected to a control system which adapts the milk vacuum as a function of the measured flow of milk out of the teat in order to reduce teat point loading.

The invention further provides a device for the pneumatic milking of animals, in particular cattle such as cows and goats, comprising at least one teat cup and a vacuum generator for the generating in the teat cup of a vacuum, the vacuum generator being driven by means of a fluid under overpressure.

In one embodiment of the device the vacuum generator is configured for generating a reduced pressure in the range of from 30-100 kPa, in one embodiment using compressed air as a fluid under overpressure, in a further embodiment using air under an overpressure of from 1-10 bar.

The invention further provides a teat cup comprising a peripheral teat cup wall, a teat liner in the teat cup, and a vacuum generator for generating a reduced pressure in a teat cup space between the teat cup wall and the teat liner and which is driven by means of a fluid under overpressure.

In one embodiment of the teat cup the vacuum generator comprises an inlet for fluid under overpressure, a flow channel, an outlet for the fluid, a flow part in the flow channel comprising a restriction having a sectional surface area which is smaller than the sectional surface area in the inlet, and a reduced pressure connection comprising an opening in the flow channel in the restriction and an opening in the teat cup space.

In one embodiment of the teat cup the teat liner is preformed by thickenings which extend radially from the peripheral wall of the teat cup. The size of the teat cup space is thus reduced, so a smaller volume has to be brought to the desired pressure, thus reducing response times and improving the manageability of the milking process. In addition, the preforming allows it to be determined in which manner the teat liner will be compressed. In a further embodiment the thickening runs along the entire circumference of the peripheral wall of the teat cup. In a further embodiment the thickening is formed integrally with the peripheral wall of the teat cup and forms a single entity with the wall of the teat cup.

The invention further provides a device for the separating of air from milk in a milking device, comprising a vacuum generator for generating a reduced pressure, which vacuum generator is driven by means of fluid under overpressure.

The invention further provides a method for the milking of animals using a pneumatic milking device provided with at least two teat cups, fluid under overpressure being generated and being supplied to at least one vacuum generator, and the vacuum generator providing under the influence of the fluid under overpressure a reduced pressure in at least one of the teat cups for the releasing of milk.

It will be understood that the various aspects mentioned in the present patent application can be combined and may each be considered independently for a separate patent application, in particular concerning, inter alia, the teat cup and the air separator.

BRIEF DESCRIPTION OF THE FIGURES

The invention will be described hereinafter in greater detail and an exemplary embodiment of a milking device according to the invention will be illustrated with reference to the figures, in which.

DESCRIPTION OF EMBODIMENTS

Figure 1:
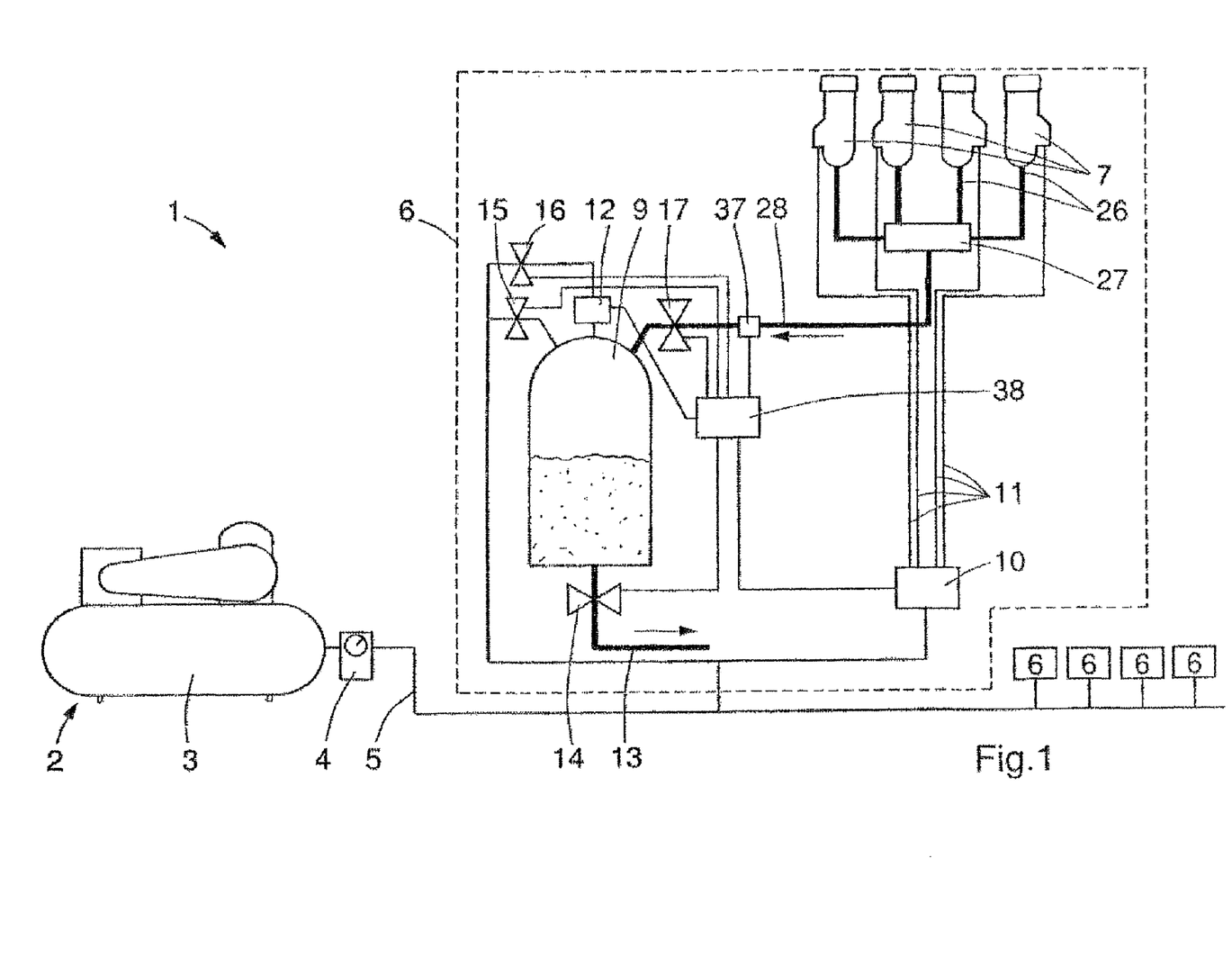
FIG. 1 is a schematic view of a milking device according to the invention.

FIG. 1 is a schematic view of a milking device 1 according to the invention that operates in this embodiment on compressed air and is provided for this purpose with a compressor 2 which is provided with a pressure vessel 3. The pressure vessel 3 is connected to a compressed air conduit 5 which in this case is provided with a pressure meter 4 comprising a regulator and filter unit. The pressure conduit or compressed air conduit 5 is shown schematically connected to various milking points 6, each milking position or milking point for a single cow in this embodiment.

In FIG. 1 one of the milking points 6 is again represented schematically in greater detail and comprises the following components.

A milking set is in this case provided with four teat cups 7 (also known as teat holders), by means of short milk conduits 26 connected to a milk claw 27. The milk claw 27 is connected to a milk conduit 28 which discharges the milk to an air separator 9 and which is provided with a valve 17 which can be operated, for example, by means of compressed air or electrically.

The compressed air conduit 5 has a branch to each milking point 6 from which one branch leads to a valve block 10 which splits the branch into teat cup compressed air conduits 11 which are each connected to a teat cup. Each teat cup 7 has in this case a teat cup compressed air conduit 11.

The milk is discharged by means of the milk conduit 13 out of the air separator 9 to a collecting tank (not shown). The air separator 9 is provided with a valve 14 in the milk conduit 13 which is operable by means of compressed air or electronically.

The air separator 9 can be introduced into the space above the milk at overpressure. For this purpose, the air separator 9 is connected to a branch of the compressed air conduit 5. This branch can in this case be closed by means of a valve 15 operated by compressed air or electrically.

The air separator 9 is further provided with a vacuum generator 12, in a preferred embodiment of the same type as the vacuum generator described hereinafter of the teat cups 7. This vacuum generator is driven by means of air under overpressure or compressed air which originates via branches from the compressed air conduit 5.

The milking device 1 further comprises a control unit 38 which is operatively connected to a sensor 37 for the measuring of the flow of milk (flow rate), and optionally other milk properties such as colour, conductivity, temperature and the like. Furthermore, the control unit is in this case operatively connected to the vacuum generator 12, to the valves 14, 15, 16 and 17, and to the valve block 10.

Figure 2:
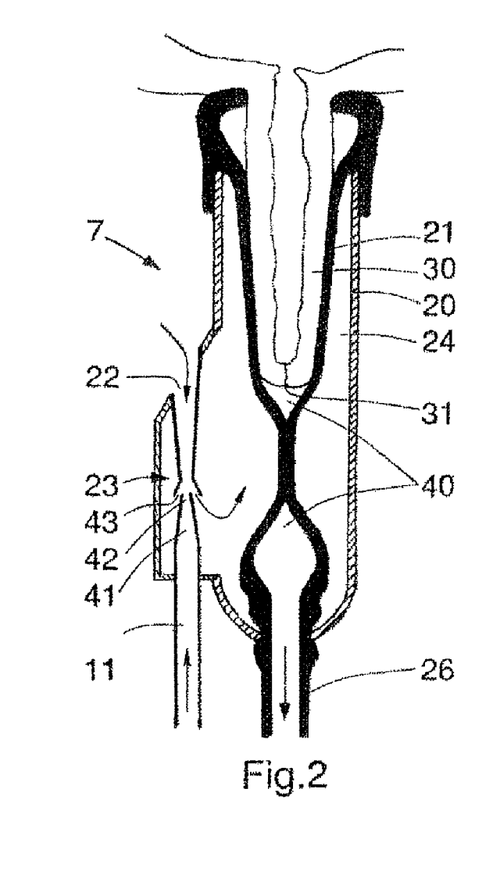
FIG. 2 is a cross section of a teat cup according to the invention not in use.

FIG. 2 is a cross section of one of the teat cups 7. The teat cup 7 has a peripheral teat cup wall 20 having therein a teat liner 21 comprising a teat space 40, and between the peripheral teat cup wall 20 and teat liner 21 the teat cup space 24. The teat liner may be of a type known per se.

The teat cup 7 is in this case provided with an ejector-type vacuum generator 23. An ejector 23 of the Si02-2 Coax technology type, as sold by PIAB SA, can be used as the ejector 23. This allows the (reduced) pressure in the teat cup space 24 to be adapted very rapidly. In addition, it has been found to be possible to produce during milking a taut pressure curve, i.e. a pulsation cycle having a smooth course.

An ejector 23 of this type comprises an inlet 41, a flow channel and in the flow channel an outflow opening 43 having a sectional surface area which is smaller than the sectional surface area of the inlet 41. The outflow opening 43 opens into the flow channel in a flow chamber having a sectional surface area which is larger than the sectional surface area of the outflow opening 43. The flow chamber is connected to an outlet 22 and via said outlet to a space outside the ejector. The Venturi effect increases the speed, and thus reduces the pressure, of air flowing through the outflow opening 43. The arrangement in series of a plurality of outflow openings, each having a larger sectional surface area, provides a larger vacuum capacity and an improved output. An arrangement of this type is also referred to as a "multistage ejector". An embodiment comprising an adaptable outflow opening in order locally to set a specific reduced pressure is conceivable.

An ejector is also referred to as an aspirator or mini-eductor. In fact, an ejector may be regarded as a device which generates a reduced pressure by means of application of the Venturi effect, for example by means of a fluid having a flow speed or a difference in pressure before and after a restriction.

The ejector 23 is received in a receiving space in the peripheral wall, as a result of which the inlet 41 and the outlet 22 emerge outside of the teat cup space 24 and the flow channel is fluidically connected to the teat cup space 24.

In the illustrated embodiment the outlet 22 in the ejector is directed toward the udder. It is also conceivable, possibly in order to prevent disturbance to a cow as a result of the air which is blown out, to reverse the ejector, i.e. for example to point the outlet 22 in the ejector away from the udder or teat during use. It may also be conceivable to connect the outlet 22 to a return conduit, for example if use is made of a fluid other than air.

In the situation illustrated in FIG. 2 a reduced pressure is applied to the milk conduit 26 and no overpressure is placed on the inlet in the ejector 23. As a result, an atmospheric pressure prevails in the teat cup space 24, and when a teat 30 is introduced into the teat space 40 the teat liner is closed as a result of the difference in pressure between the teat cup space 24 and the teat space 40.

For rapid response of the milking device, it is preferable if the teat cup space 24 is as small as possible. In one embodiment this teat cup space 24 is smaller than approximately 50 ml, and even smaller than 25 ml has been found to be possible. A lower limit for that volume is approximately 5 ml. Such small volumes can be achieved by, for example, at least locally thickening the inside of the teat cup wall 20, or at least locally thickening the wall of the teat liner 21. A combination of these measures is also conceivable. Use may also successfully be made of an unround teat liner, such as a teat liner having a triangular or square cross section instead of the teat space in the teat liner 21.

Figure 3:
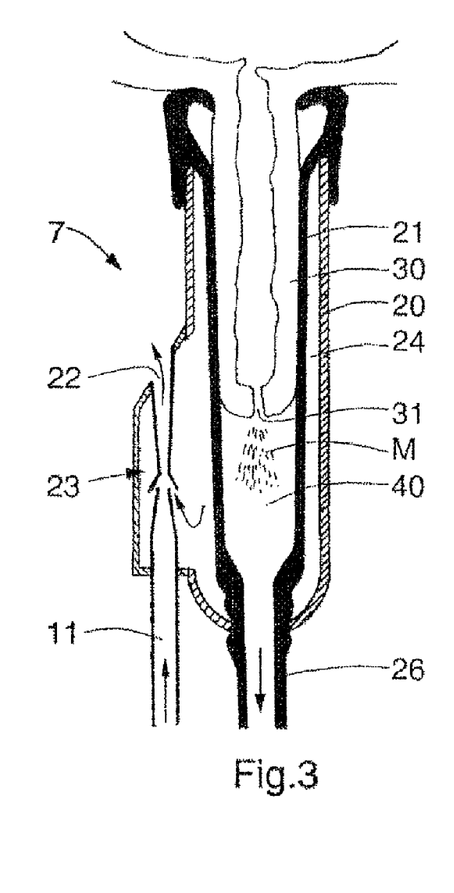
FIG. 3 shows the teat cup from FIG. 2, in the milking position, compressed air being supplied.

FIG. 3 shows the milk cup or teat cup 7 from FIG. 2 in the milking position. In this situation, compressed air is supplied and thus a vacuum/reduced pressure generated by the ejector 23 in the teat cup space 24 between the teat cup wall 20 and the teat liner 21. As a result, the teat liner is drawn open and the reduced pressure of the milk conduit 26 reaches the milk opening in the teat and the milk M is able to be expelled.

Figure 4:
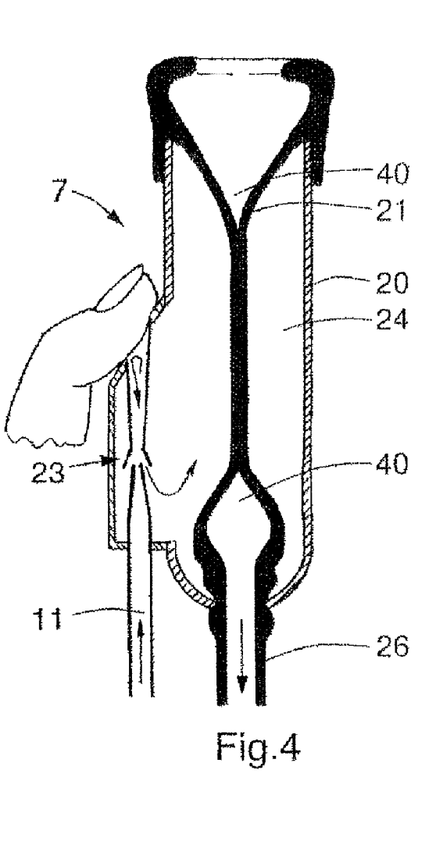
FIG. 4 shows the teat cup from FIG. 2, the teat holder being closed off by overpressure.

FIG. 4 shows the teat cup 7 from FIG. 2 in a condition in which the outlet 22 in the ejector 23 is closed off by hand and an overpressure is thus produced in the teat cup space 24. As a result, the teat space 40 is closed and the milk conduit 26 is almost impervious to external influences, and hardly any air is drawn in.

Figure 5A:
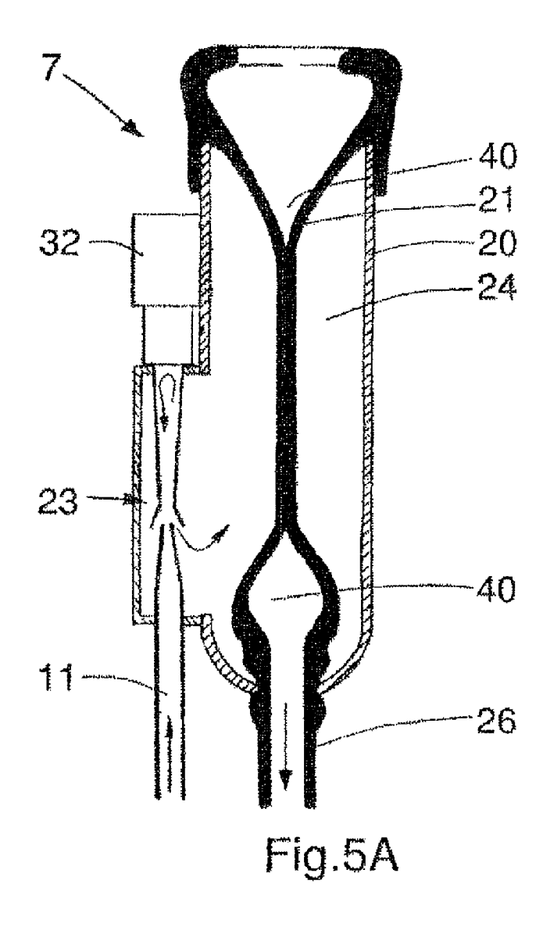
FIG. 5a shows the teat cup from FIG. 4, the opening being provided with an electronically regulatable valve, in this case in the closed position.

FIG. 5A shows the milk cup 7 in the same situation as FIG. 4, the opening being in this case provided with an electronically regulatable valve 32, in this case in the closed position. The overpressure in the teat cup space 24 closes the teat space 40.

Figure 5B:
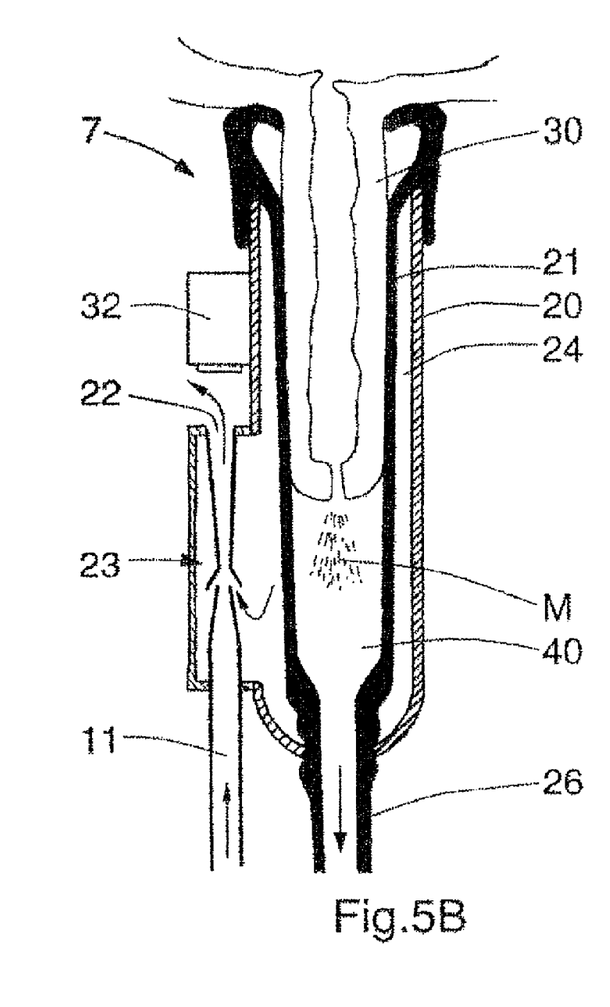
FIG. 5b shows the teat cup from FIG. 5 with the valve in the open position.

FIG. 5B shows the milk cup 7 from FIG. 5 with the valve 32 in the open position. A reduced pressure is again produced in the teat cup space 24 and the teat space opens.

FIGS. 6A-6D show a milk cup 7 having a 2-valve 33, 34 operation and a shut-off valve in the form of a ball valve 35 instead of the valve 32. In the condition shown in FIG. 6A, the valve 34 is open and the valve 33 closed. A reduced pressure is produced in the teat cup space 24 and the ball 35 is in its top position as a result of the fact that air blows out of the ejector.

Figure 6A:
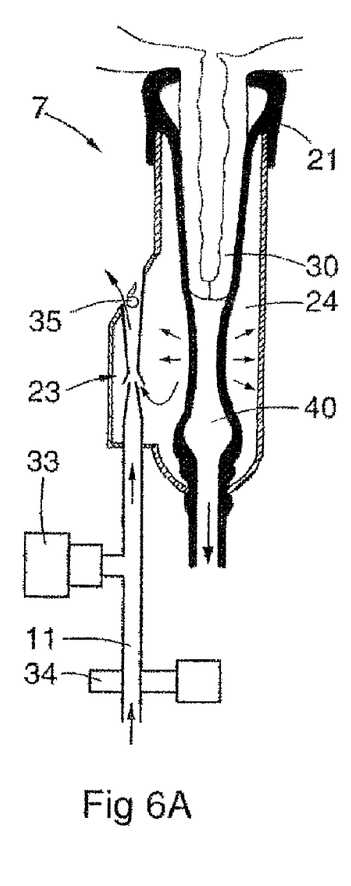
FIG. 6a-6d show the teat cup from FIG. 2 with a 2-valve operation and a shut-off valve in the form of a ball valve.
Figure 6B:
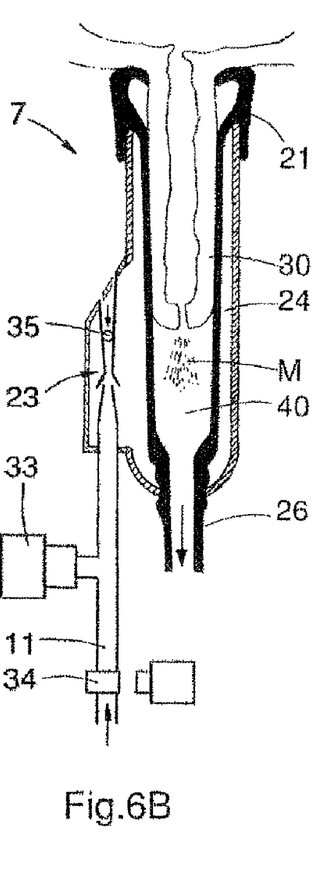

In FIG. 6B the valve 34 is closed, the valve 33 is closed and as a result of gravity the ball 35 will block the outlet in the ejector. A relatively stable reduced pressure prevails in the teat cup space 24. Milk M flows.

Figure 6C:
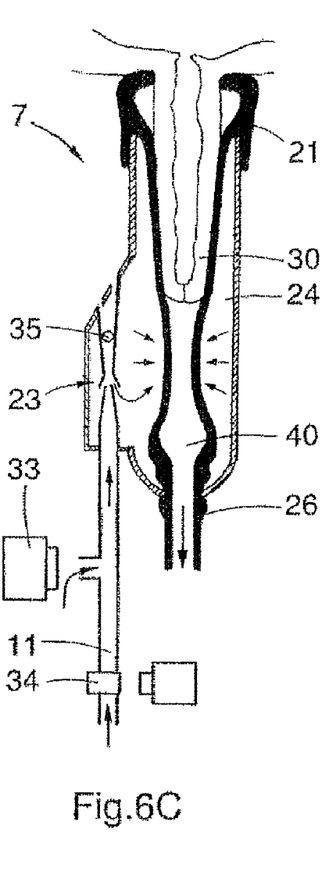
Figure 6D:
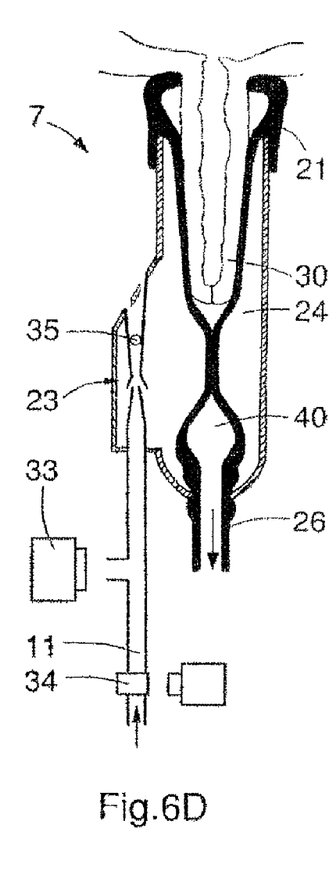

In FIG. 6C the valve 33 is opened and air under atmospheric pressure flows toward the teat cup space 24. Because a reduced pressure still prevails in the teat space 40, the teat space 40 will be closed. This final situation is shown in FIG. 6D.

Figures 7A, 7B, 7C, 7D, 8:
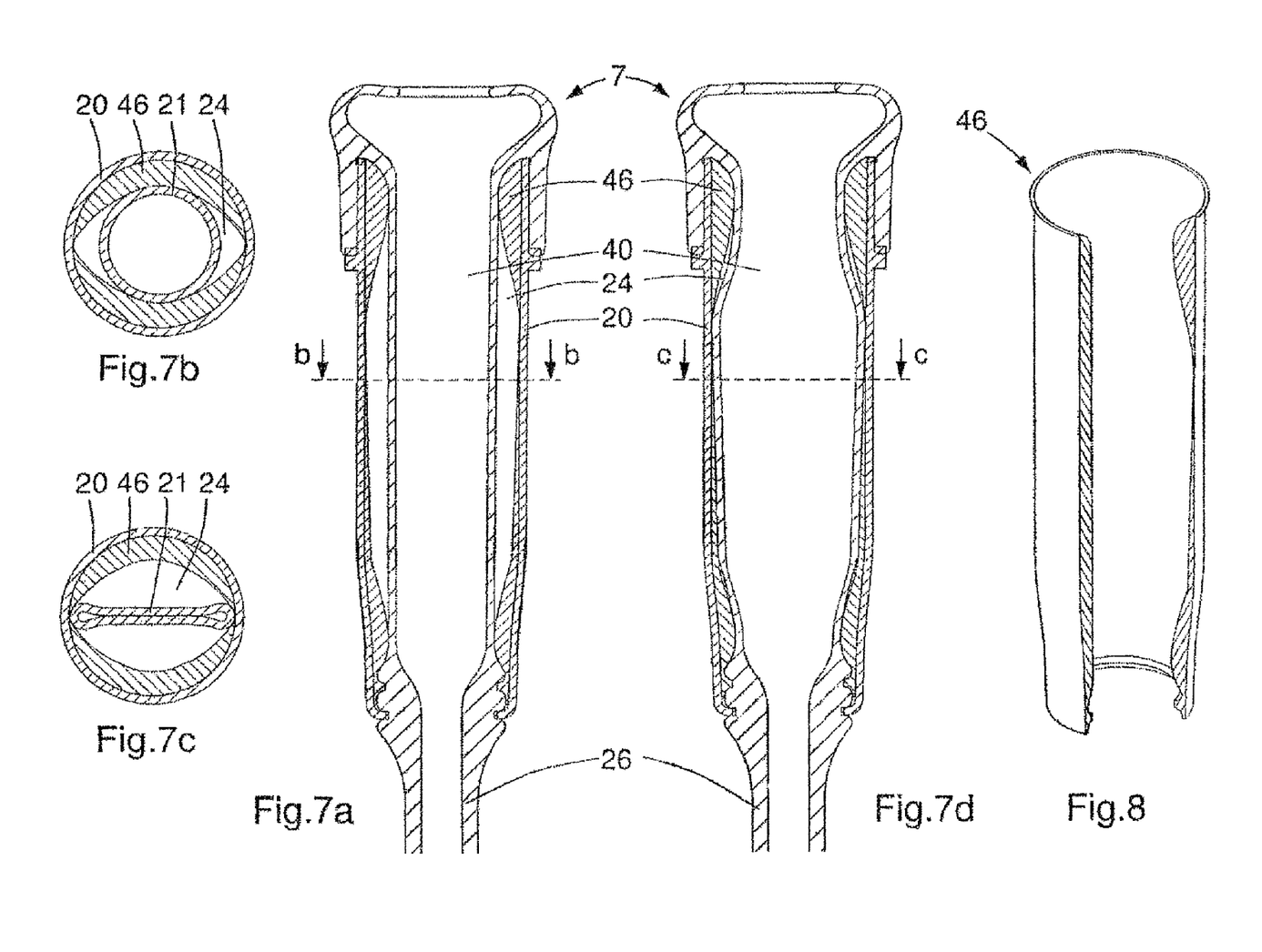
FIG. 7a-7d show an embodiment of the teat cup according to the invention provided with a teat cup space filler.
FIG. 8. is a perspective view of the teat cup space filler from FIGS. 7a-7d.

FIGS. 7A-7D are various views of a milk cup 7 provided with a teat cup space filler 46. The teat space filler 46 has a hollow cylindrical shape. The outer circumference of the teat cup space filler 46 adjoins the teat cup wall 20. The inner circumference of the teat cup space filler 46 is provided with peripheral thickenings. These thickenings are attached to the upper edge and the lower edge of the teat cup space filler 46 which is provided between the teat cup wall 20 and the teat liner 21 to reduce the size of the teat cup space 24 in order to shorten the response times of the milking device. In one embodiment this teat cup space 24 is smaller than approximately 50 ml, and even smaller than 25 ml has been found to be possible. A lower limit for that volume is approximately 5 ml. Also conceivable is a peripheral thickening which covers a portion of the inner circumference of the teat cup space filler 46. In this way, the teat liner 21 is locally compressed somewhat by the thickening. It is thus possible to determine in advance the location of the folded seam of the teat liner when the teat liner 21 is closed as a result of the difference in pressure between the teat cup space 24 and the teat space 40. FIG. 7b is a cross section along line b in FIG. 7a. It will be clear that the teat cup space filler 46 reduces the size of the teat cup space 24. The teat liner 21 is not closed and rests against the teat cup space filler 46. It is possible for the teat liner 21 to be in this case pressed in somewhat in order to determine in advance the location of the folded seam of the teat liner when the teat liner 21 is closed as a result of the difference in pressure between the teat cup space 24 and the teat space 40. FIG. 7c is a cross section along line c in FIG. 7d. The teat liner 21 is in this case compressed as a result of the difference in pressure between the teat cup space 24 and the teat space 40.

FIG. 8 is a perspective sectional view of the teat cup space filler 46 from FIGS. 7A-7D. In this embodiment the teat cup space filler 46 is not rotationally symmetrical.

Figure 9:
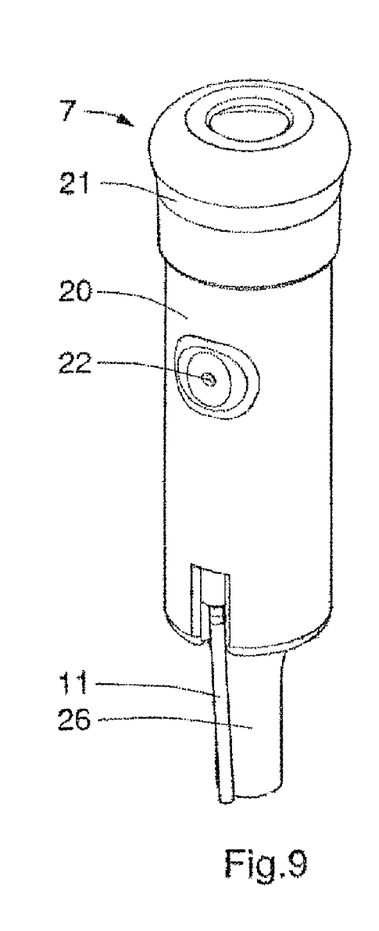
FIG. 9-9B shows an embodiment of the teat cup according to the invention provided with a size-reduced teat cup space.
Figure 9A:
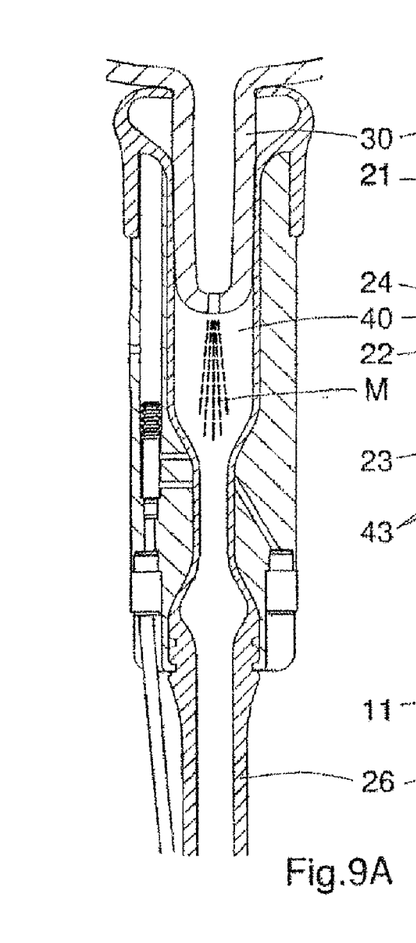
Figure 9B:
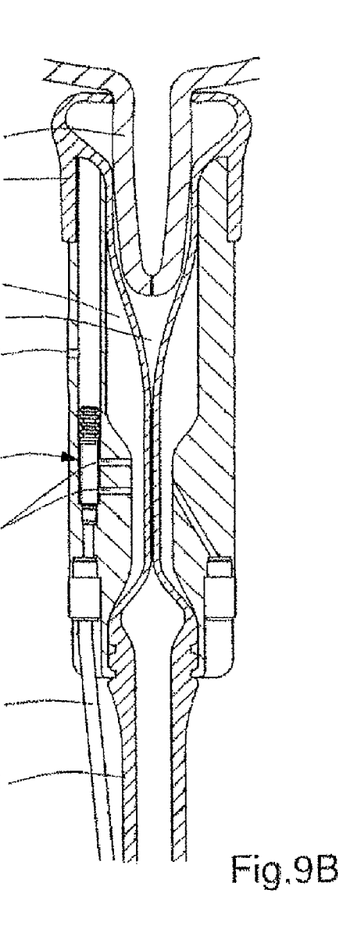

FIGS. 9-9B show an embodiment of the teat cup 7 according to the invention. All alterations to the embodiment in FIGS. 2-4 will be described. In this embodiment the teat cup wall 20 is thickened in order to preform the teat liner 21. Accordingly, the teat cup space 40 is smaller when the teat liner 21 is closed as a result of the difference in pressure between the teat cup space 24 and the teat space 40. Furthermore, the preformed teat liner 21 allows it to be determined in advance about which folding line the teat liner 21 is closed.

In this embodiment the ejector 23 is received within the cylindrical circumference of the milk cup 7. The ejector 23 is fluidically connected to the teat cup space 24 by means of connections 43. The outlet 22 in the ejector 23 is directed radially away from the teat 30. This milk cup 7 can be handled by the integrally received ejector 23 and by the outlet 22 which the operator can easily seal using his finger.

In one embodiment two ejectors are placed directly above in the air separator, whereas the teat cups are further connected to a reduced pressure conduit. This is done to eliminate a number of disadvantageous effects and to use the ejectors as effectively as possible. The ejectors are in this case, for example, 2-stage ejectors, for example the SI32-2 from Piab.

An advantage of this is that the vacuum level can be controlled/regulated rapidly and directly in the event of faults occurring in the vacuum level.

A vacuum is thus generated in the air separator. The air separator is connected to the milk hose and can thus draw in air through the milk hose and in this way there is produced via the collector and the milk hose a vacuum in the teat space, as a result of which milk flows out of the teat and is drawn via the receiving piece and milk hose to the air separator. As milk has a greater specific weight than air, the milk is not drawn into the ejector but rather the milk drops into the milk/air separator.

One ejector is operated by a directly controlled 2/2 proportional valve. This 2/2 proportional valve is activated by the PLC and is operated continuously throughout the milking process in order to be able to obtain the vacuum level of from 10-50 kPa.

The other ejector is also operated by a directly controlled 2/2 proportional valve and operated by the PLC. However, the difference from the activation of the other ejector consists in the fact that this ejector is not activated continuously. This ejector is positioned in order to maintain the vacuum level at the desired level to eliminate faults. These faults are produced for the most part by the pulsation strokes of the pulsator. By then activating the ejector, for example, 0.1 sec earlier than the pulsation stroke, the fault in the vacuum level can be eliminated and removed by the use of the second ejector.

In order during start-up of the installation to reach the desired vacuum level within a short time, the operator may choose simultaneously to activate the two ejectors for a short time. This allows the desired vacuum level to be reached within a very short time and also the buffer vessel to be brought to the desired pressure.

The advantage which can be obtained from this embodiment is that the flow of milk can be milked in a controlled manner. This means that the milk vacuum for each cow can be regulated electronically and the vacuum can thus be adapted to the amount of milk which the cow produces. As a result, teat point loading during milking is limited as far as possible and irritated teats are prevented.

In this case too, the air separator is directly connected to the buffer vessel. The ejectors thus also ensure that the buffer vessel is pressurized and kept under pressure.

The buffer vessel is positioned in order to be able to intercept any faults. The pulsator is also placed directly above the buffer vessel and also then obtains the pulsation vacuum therefrom.

The advantage of the use of the ejector is that the ejector does not have to be activated continuously, but only during the milking process. This has the advantage that it is to a certain degree (±30%) more energy-efficient than current technologies in which the vacuum pump is operated continuously throughout the milking process.

In another embodiment the buffer vessel is not coupled directly to the air separator. However, there is placed in the buffer vessel an ejector which keeps the buffer vessel at a higher vacuum than that required in the air separator.

The vacuum level in the air separator is then regulated by means of a vacuum regulator which regulates the vacuum level back to the desired vacuum level, for example 40 kPa. The air separator is thus connected to the buffer vessel via the vacuum regulator.

The advantage of this embodiment is that the fluctuations in pressure which are produced by faults of, for example, the pulsator can be eliminated substantially directly by means of this buffer vessel.

Figure 10:
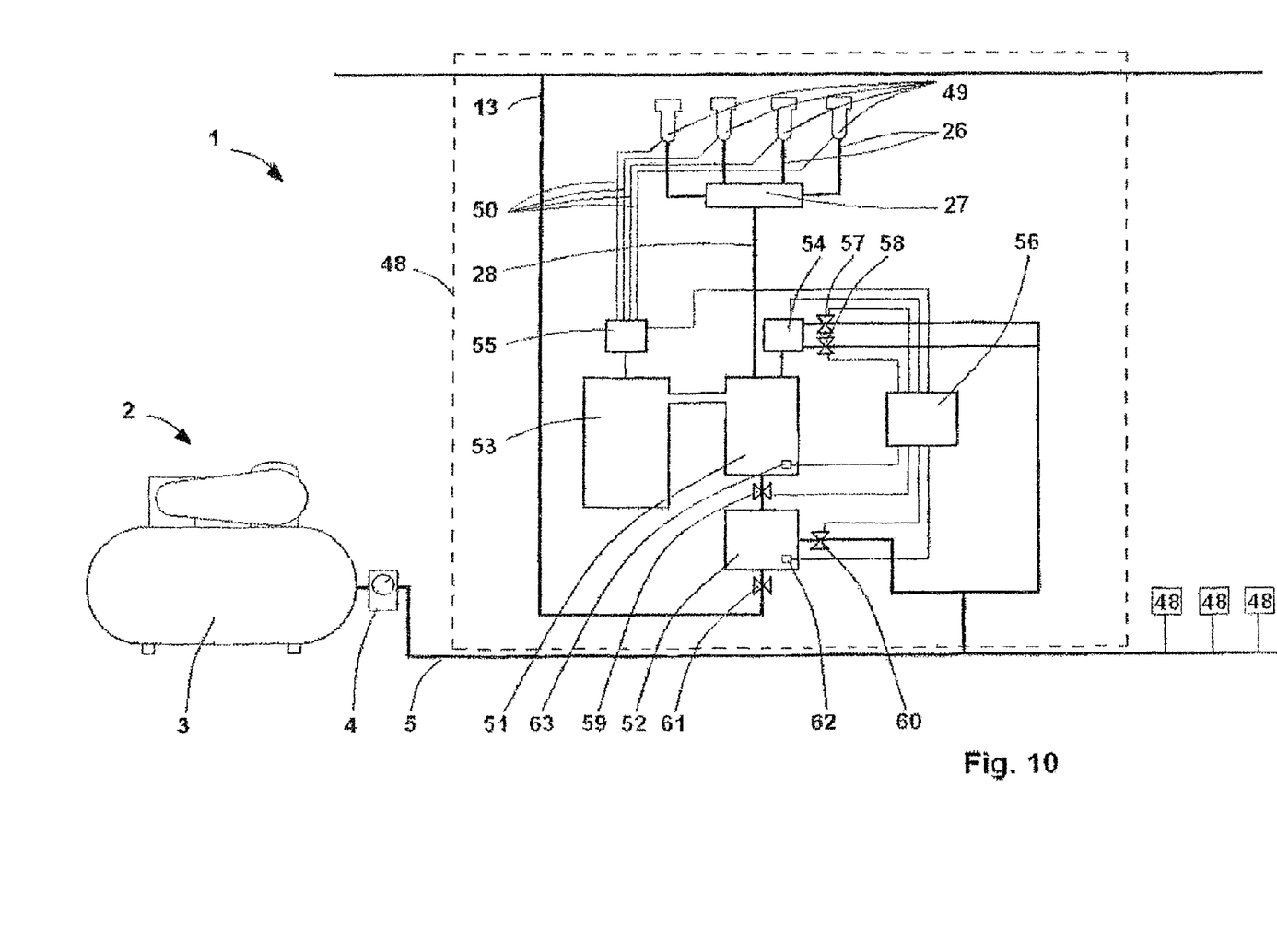
FIG. 10 is a schematic view of an alternative embodiment according to the invention.

FIG. 10 is a schematic view of an embodiment of a milking device 1 according to the above-described embodiment according to the invention. This embodiment operates, again, based on compressed air and, again, includes a compressor 2 which is provided with a pressure vessel 3. The pressure vessel 3 is connected to the compressed air conduit 5 which is in this case provided with a pressure meter 4 comprising a regulator and filter unit. The pressure conduit or compressed air conduit 5 is shown schematically connected to various milking points 48, each milking position or milking point for a single cow in this embodiment.

In FIG. 10 one of the milking points 48 is represented schematically in greater detail. The milking point 48 comprises the following components.

The milking point 48 is in this case provided with four teat cups 49 (also referred to as teat holders). The teat cups are in this case of a more traditional embodiment in which each is connected via a reduced pressure conduit or vacuum conduit 50 to an in this case common pulsator 55.

Each teat cup 49 is in this case further connected to a milk claw 27 by means of a short milk conduit 26. The milk claw 27 is in turn connected to a milk conduit 28 which discharges the milk to an air separator 51. The air separator 51 is brought to a reduced pressure. For this purpose, the air separator 51 is in this case operatively connected to the vacuum generator 54. Also, the air separator 51 is in this case openly connected to a buffer vessel 53.

The compressed air conduit 5 has, as stated hereinbefore, a branch to each milking point 48 from which one branch leads to the vacuum generator 54. Before the conduit reaches the vacuum generator 54, said vacuum generator is split in order to be able to activate by means of the proportional 2/2 valve 57 and 58 two ejectors of the vacuum generator 54.

The milking device 48 further comprises a control unit 56 which is operatively connected to sensors 63 and 62 for the measuring of the level of the milk in the air separator 51 and the level of the milk in the pressure chamber 52. Furthermore, the control unit is in this case operatively connected to the reduced pressure generator or vacuum generator 54, to the valves 59, 60, 57, 58, and to the pulsator 55 which is positioned above the buffer vessel 53. The pulsation stroke is transmitted by means of the reduced pressure conduits 50 to the teat cup space of each of the teat cups 49.

The mode of operation of the outlined embodiment from FIG. 10 is as follows. Milk is discharged by means of the air separator 51 via the valve 59 to the pressure chamber 52. This pressure chamber 52 has a specific content, allowing the milking speed and amount to be measured by means of the sensor 62. When the level of the milk reaches the sensor 62, the valve 59 will close and the milk will be pressed away by means of an overpressure which is introduced through the compressed air conduit via the valve 60 into the pressure chamber 52. The milk is then discharged via the milk conduit 13 to a collecting tank (not shown).

The valve 61 will be closed again once the level has dropped to/below the sensor 62, after which the valve 59 will open again and the pressure chamber 52 will be brought back to a reduced pressure. The cycle can proceed again.

Figure 11:
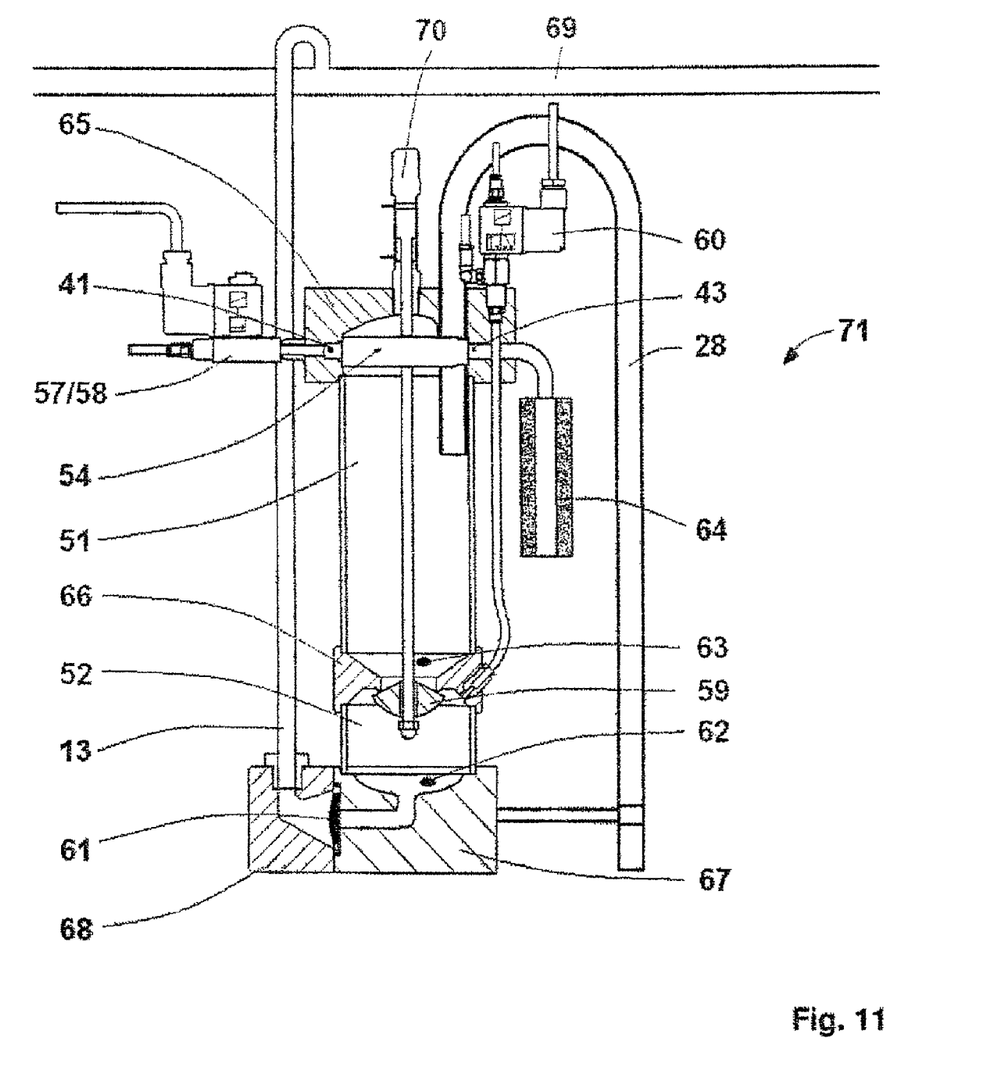
FIG. 11 shows a schematic embodiment of an air separator according to one aspect of the invention.

FIG. 11 shows schematically in greater detail an embodiment of, inter alia, an air separator 51 from FIG. 10. As far as possible, the reference numerals correspond to FIG. 10.

The proportional 2/2 valve 57 and 58 (both of which include a coil) controls the required amount of fluid under overpressure by means of the inlet 41 in the vacuum generator through a flow channel of the vacuum generator 54, in this case a 2-stage ejector, as a result of which a reduced pressure is produced in the air separator 51. The fluid under overpressure leaves the vacuum generator 54 by means of the outflow opening 43 and is discharged by means of a muffler 64.

The reduced pressure which is generated by the vacuum generator 54 provides via the vessel of the air separator 51 a reduced pressure in the milk conduit 28. As a result of this reduced pressure, the milk is drawn out of the teats. The milk is discharged via the milk conduit 28 to the air separator 51.

The (pneumatically activated) valve 59 is opened in the illustration. This allows the milk to flow also into the pressure chamber 52. When the level of the milk reaches the sensor 63, the control unit (not shown) will allow the valve 59 to be closed by means of the operation of the cylinder 70. When the valve 59 is closed, a fluid under overpressure, in this case compressed air which will be introduced into the pressure chamber by means of the valve 60, will press the milk away along the non-return valve 61 through the milk discharge conduit 13 by means of the main conduit 69 to the milk storage tank (not shown).

When the level of the milk reaches below the bottom sensor 62, the 3/2 valve 60 will cease to press the milk away and said valve will also deaerate the pressure chamber 52: the overpressure is also, again, discharged by means of this 3/2 valve 60.

Once in the pressure chamber 52 the overpressure has been reduced again, the valve 59 can be opened again and, as soon as the overpressure on the pressure chamber has been removed, the non-return valve 61 will be closed again, after which the process recommences.

During the opening of the valve 59 the cylinder 70 will fall. As a result of the fact that the valve 59 is designed with a certain degree of play around the piston rod of the cylinder 70, this valve 59 will not also fall in the same way; this is due to the fact that there still prevails in the pressure chamber 52 an atmospheric pressure and in the air separator 51 a reduced pressure, as a result of which this valve 59 is still pressed into the seat of the connecting tube 66. This atmospheric pressure will be discharged only via the space between the valve 59 and the piston rod of the cylinder 70 by means of the ejector 54, as a result of which there is produced in the pressure chamber 52 a reduced pressure and the weight of the milk and the reduced pressure push the valve 59 downward onto the cap nut at the end of the piston rod of the cylinder 70. The advantage of opening the valve 59 in this way is that this will produce no air swirls in the milk located in the air separator.

Figure 12:
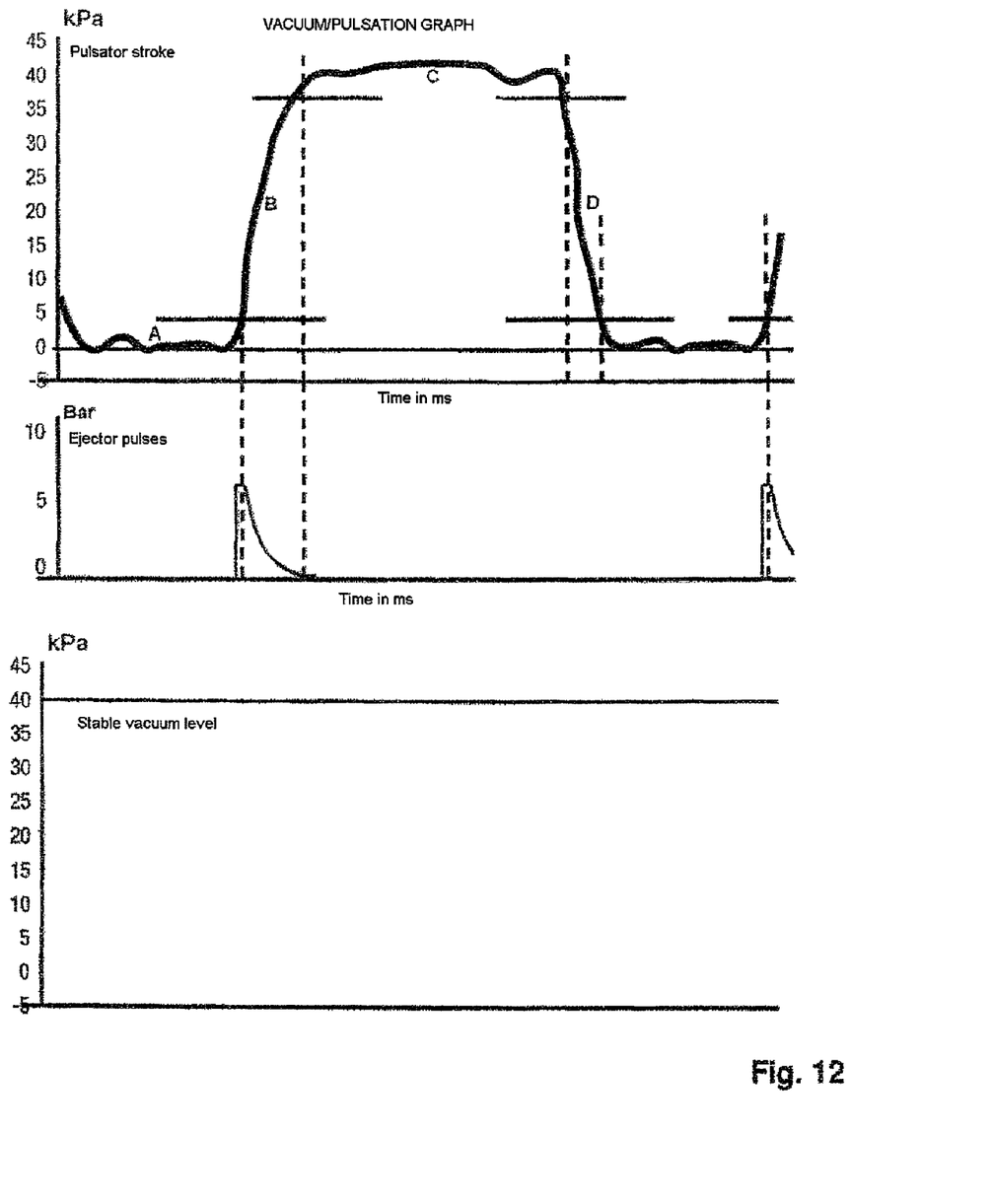
FIG. 12 shows graphs plotting the pulsator pressure and corrections.

FIG. 12 shows a number of graphs with the pressure course in a milking point 48 from FIG. 10. The top graph shows the reduced pressure of the pulsation cycle which is caused by the pulsator. This pulsation cycle lasts for one second, after which it recommences. This pulsation stroke produces faults in the vacuum level. These faults have to be eliminated. This is done by starting to use one of the ejectors for this purpose. By activating this ejector 0.1 second earlier than the pulsation cycle commences, a fault in the vacuum level can be corrected. In this graph the activation of the ejector is represented by the middle graph in which the overpressure on the ejector is indicated as a function of time. The ejector is in this case activated by giving it a short pulse. As a result, the ejector creates in turn vary rapidly a reduced pressure.

The activating of the ejector creates a very stable vacuum level which is represented in the bottom graph.

Figure 13:
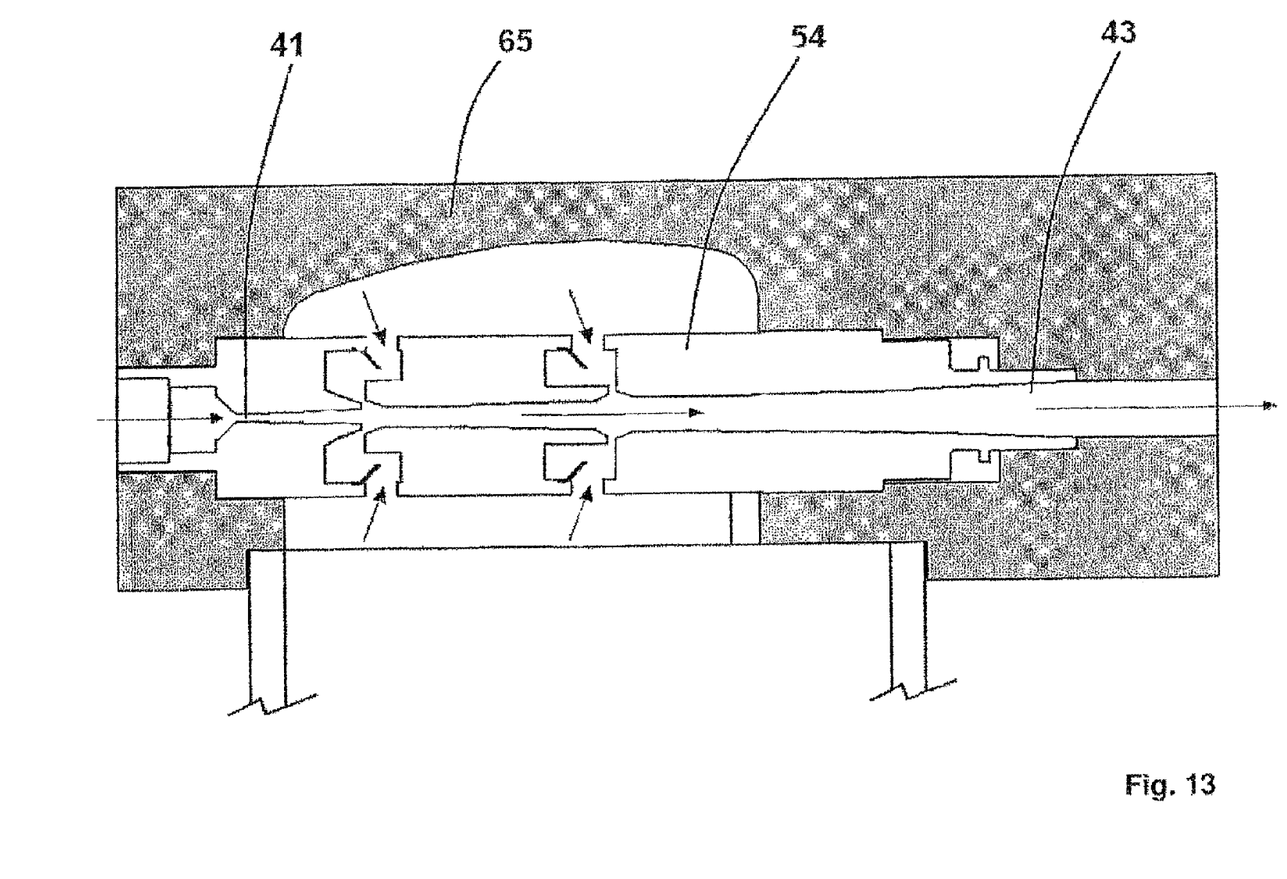
FIG. 13 is a detailed view of an ejector.

Finally, FIG. 13 shows a detail from the illustration of FIG. 11. In fact, this to a large extent integrates the reduced pressure generator 54 with the air separator 51. The upper lid 65 of the air separator 51 has a head space which is openly connected to the vessel of the air separator 51. An ejector is received in the head space. The ejector has an inlet 41 for fluid under overpressure and an outlet 43 for the fluid. The inlets for air are indicated by the oblique arrows. The flow of the fluid under overpressure from the inlet 41 to the inlet 43 produces a reduced pressure, as a result of which air is drawn in by means of the side inlets. In this design this allows air to be drawn directly out of the vessel of the air separator 51.

Industrial Applicability and Mode of Operation

The present description of the mode of operation relates to FIG. 1. A compressor 2 is placed centrally in the milking device using the pressure vessel 3. Compressed air is passed by means of conduits 4 to the locations in the milking device where a vacuum has locally to be created such as teat cups 7 and the air separator 9.

The peripheral teat cup wall 20 contains the teat liner 21 including the teat 30. The teat cup 7 has a teat cup space 24 between the teat cup 20 and the teat liner 21, where there is located the ejector 23 through which compressed air is blown. This produces a vacuum around the teat liner 21, as a result of which the teat 30 is opened and the milk is able to flow. The air flow leaves the teat cup through the opening 22.

Similarly, the ejector system generates the milk vacuum.

As a result of the supplied compressed air, the ejector 12 generates in the air separator 9 a vacuum, as a result of which air is drawn in through the long milk hose 28, the milk collector 27 and the short milk hoses 26. This produces the milk vacuum in the teat spaces 40, as a result of which milk M is drawn out of the teat and is discharged through the milk hoses and to the milk receptacle, in this case the air separator 9.

As a result of the milk vacuum, the milk M is drawn out of the opened teat 30. The valve block 10 subsequently interrupts the flow of compressed air in a pulsating manner, and the air inlet replaces the air outlet as the opening. This produces normal atmospheric pressure in the teat cup space 24, causing the teat to close. Subsequently, the high-pressure air flow is allowed again and the cycle recommences.

When the outlet/inlet 22 is closed off by hand, as shown in FIG. 4, or electronically by means of a valve, as represented in FIG. 5A-5B, an overpressure will be produced in the teat cup space 24 as a result of the fact that the compressed air no longer has an exit. As a result, the teat liner 21 will close and the milk cup 7 can easily be placed around the teat.

The control unit 38 activates the valve block 10; as a result, the milk vacuum is regulated in such a way that the teat point 31 is loaded as little as possible during milking.

When the teat holder 7 is in operation, vacuum and the pressure of the outside air prevail alternately in the pulsation space (teat cup space 24). Vacuum (reduced pressure) prevails in the teat space 40 during milking. When the pressure inside and outside the teat liner is identical, the liner is in an opened—normal—position. Because in this situation milk flows out of the teat, this period is referred to as the suction stroke or b phase.

After some time the pulsator breaks off the connection of the pulsation space to the vacuum conduit and then allows outside air to flow into the pulsation space. There is now produced between the inside and outside of the teat liner wall a difference in pressure which causes the wall of the teat liner under the teat to collapse and the teat liner to close. This situation is referred to as the rest stroke or d phase. No milk then flows out of the teat.

Subsequently, the pulsator again allows a vacuum in the pulsation space, as a result of which the cycle of movement of the teat liner is repeated.

A vacuum and outside air pressure or atmospheric pressure prevail in the pulsation space of the teat holders alternately. The drawing-off of air and the allowing of air to flow take up a certain amount of time. These periods form the transition phases. The pressure course during the alternation of vacuum and outside air can be represented in a curve. A complete alternation is referred to as the pulsation cycle.

The pulsation cycle consists of four components (see also FIG. 12, top graph), also referred to as phases:
a phase=the phase of transition from atmospheric pressure to vacuum
b phase=the stationary vacuum phase
c phase=the phase of transition from vacuum to atmospheric pressure
d phase=the stationary atmospheric phase In order to analyze the pulsation curve, the curve is provided with measurement lines. The bottom measurement line is placed 4 kPa above the base line, the top measurement line 4 kPa beneath the top of the curve. The various phases start and end at the intersections of the measurement lines and the pulsation curve. The duration of a phase can be represented both in milliseconds and in percentages of the pulsation cycle. Generally, the phases are given in percentages of the cycle time. The suction stroke consists of the a and b phase, the rest stroke of the c and d phase. The suction/rest stroke ratio is represented as a+b:c+d. P/min, the number of pulsations, is usually from 50 to 65 pulsations per minute. The suction/rest ratio is usually from 50:50 to 70:30. A high S:R ratio of 65:35/70:30 is often combined with approximately 60 P/min. The a phase must preferably be no longer than 20 percent of the cycle time and at most 200 ms. The b phase must, under ISO recommendations, be at least 30 percent or 300 ms of the cycle time. It is assumed that 55 percent (550 ms) can be used as the maximum value. The c phase causes what are known as cyclic vacuum variations. There are no specific standards for these. Generally, the c phase is from 10 to 15 percent. C phases of shorter than 10% would appear to be less desirable. The d phase may be no shorter than 15 percent of the cycle time or 150 ms. An upper limit of 300 ms would appear to be the maximum. In the case of flow of milk-controlled pressure exchange systems, the number of pulsations and the design of the pulsation curve are not constant; instead, these are controlled by the flow of milk. A cow which produces a large amount of milk is in this case milked with a higher S:R ratio than a cow which produces a small amount of milk. In many cases, the number of pulsations/minute is also adapted.

The reduced pressure will usually be about 50 kPa, in particular from approximately 38-45 kPa. It has been found that the use of the ejector as described allows a very beneficial pulsation curve to be achieved. It is even possible to adapt or to adjust the pulsation curve for each teat (for example in a cow). In addition, the reaction time of the ejector can be made very short.

It will be understood that the foregoing description is intended to illustrate the mode of operation of preferred embodiments of the invention, and not to limit the scope of the invention. Starting from the foregoing discussion, a person skilled in the art will immediately think of a large number of variations which fall under the spirit and the scope of the present invention.

The invention claimed is:

1. A milking device for milking an animal, the milking device comprising:
a plurality of vacuum generators that are operatively connected to the animal and which are driven by a fluid under overpressure;
at least two teat cups operatively connected to the vacuum generators, the at least two teat cups each having a peripheral teat cup wall having therein a teat liner comprising a teat space in which a teat can be placed, and between the teat liner and the teat cup wall a teat cup space;
a compressor provided with at least one pressure conduit which supplies air under overpressure at the teat cup,
wherein the vacuum generators are provided with an inlet which is connected to the pressure conduit, a flow channel provided with a restriction, an outlet for letting air out of the vacuum generators, and a reduced pressure connection which has an opening in the flow channel between the inlet and the outlet in the restriction and in the teat cup space, in such a way that, when compressed air is passed through the vacuum generators, a vacuum is produced in the teat cup space so a teat received in the teat liner is opened and milk is able to flow.

2. The milking device of claim 1, wherein the plurality of vacuum generators are configured to generate a vacuum decentrally at a milking station.

3. The milking device of claim 1, wherein the plurality of vacuum generators comprise ejectors which generate a vacuum using the Venturi effect.

4. The milking device of claim 1, wherein the pressure conduit is further connected to an inlet of a second vacuum generator having a reduced pressure connection which is operationally connected to an air separator which generates in the air separator of a vacuum for the causing via a milk conduit, which may or may not be provided with a milk collector, of a milk vacuum in the teat space for drawing milk out of the teat which milk is discharged via the milk conduit to the air separator.

5. The milking device of claim 4, further comprising:
a control system which controls an inflow of compressed air into the teat cup space for producing an overpressure, as a result of which the teat liner is closed so when the teat cup is not placed against a teat no air is drawn via the teat liner toward the milk vacuum, as a result of which no loss of vacuum occurs and less reserve capacity and less power of the vacuum generator are required.

6. The milking device of claim 5, wherein the outlet in the vacuum generators comprises a valve for closing-off the outlet in the ejector so the compressed air provides an overpressure in the space for the squeezing of the teat liner, so when the teat cup is not placed against a teat no air is no longer drawn via the teat liner toward the milk vacuum.

7. The milking device of claim 6, wherein the outlet in the vacuum generators is formed such that said outlet can be closed off manually.

8. The milking device of claim 7, further comprising:
a measuring device which measures a milk flow; and
a control system operationally coupled to the measuring device which adjusts the milk vacuum as a function of the measured flow of milk out of the teat.

9. The milking device of claim 1, wherein each of the plurality of vacuum generators comprises a multistage ejector.

* * * * *